United States Patent
Hauch

(10) Patent No.: US 6,430,842 B1
(45) Date of Patent: Aug. 13, 2002

(54) ASSEMBLY FOR SUPPORTING A ROTATING STRUCTURE

(75) Inventor: David A. Hauch, Afton, MN (US)

(73) Assignee: Carter Day International, Inc., Minneapolis, MN (US)

( * ) Notice: Subject to any disclaimer, the term of this patent is extended or adjusted under 35 U.S.C. 154(b) by 0 days.

(21) Appl. No.: 09/852,251

(22) Filed: May 9, 2001

(51) Int. Cl.⁷ .............................. F26B 25/00; F16J 15/18; F16J 15/26
(52) U.S. Cl. .............................. 34/601; 34/417; 34/242; 277/514; 277/908; 277/928
(58) Field of Search ....................... 34/417, 603, 634, 34/242, 601; 384/607, 606, 622; 277/395, 401, 438, 514, 552, 908, 928; 60/483

(56) References Cited

U.S. PATENT DOCUMENTS

| | | | | |
|---|---|---|---|---|
| 1,372,801 A | * | 3/1921 | David ......................... | 384/607 |
| 2,928,685 A | * | 3/1960 | Tracy ....................... | 286/11.14 |
| 3,289,953 A | | 12/1966 | Johnson et al. ............. | 241/257 |
| 3,999,897 A | * | 12/1976 | Strub ......................... | 417/424 |
| 4,298,073 A | | 11/1981 | Yates .......................... | 173/22 |
| 4,405,136 A | | 9/1983 | Elsing et al. ................. | 277/12 |
| 4,407,078 A | * | 10/1983 | Takeyama et al. ............ | 34/133 |
| 4,571,850 A | * | 2/1986 | Hunt et al. ................... | 34/242 |
| 5,067,732 A | | 11/1991 | Szabo et al. .................. | 277/11 |
| 5,163,895 A | | 11/1992 | Titus ............................ | 494/36 |
| 5,265,347 A | | 11/1993 | Woodson et al. .............. | 34/58 |
| 5,338,167 A | * | 8/1994 | Berges ........................ | 418/104 |
| 5,460,717 A | | 10/1995 | Grimwood et al. ......... | 210/175 |
| 5,605,178 A | * | 2/1997 | Jennins ................ | 137/625.651 |
| 5,611,150 A | | 3/1997 | Yore ............................. | 34/58 |
| 5,685,985 A | * | 11/1997 | Brown et al. ................ | 210/450 |
| 5,987,769 A | | 11/1999 | Ackerman et al. ............. | 34/58 |
| 6,358,416 B1 | * | 3/2002 | Miller et al. ................. | 210/248 |

* cited by examiner

Primary Examiner—Ira S. Lazarus
Assistant Examiner—K. B. Rinehart
(74) Attorney, Agent, or Firm—Briggs and Morgan, P.A.

(57) ABSTRACT

The present invention provides an improved assembly for rotating and sealing a centrifugal dryer and a dryer including such a sealing assembly. A seal according to the present invention includes an end cap supporting a bearing that in turn rotationally supports a rotor. The end cap has an attachment portion and a seal ring including a groove receiving a v-ring seal that sealingly engages the stub shaft attached to the dryer rotor. The seal ring defines a drain cavity having at least one drain port out of which any fluid that infiltrates past the v-ring seal can drain from the end cap. The drain port is disposed at a lower level than the v-ring seal and the grease seal so that fluid can drain away without accumulating and infiltrating past the bearing grease seal and into the bearing compartment formed between the end cap and rotor the stub shaft.

8 Claims, 5 Drawing Sheets

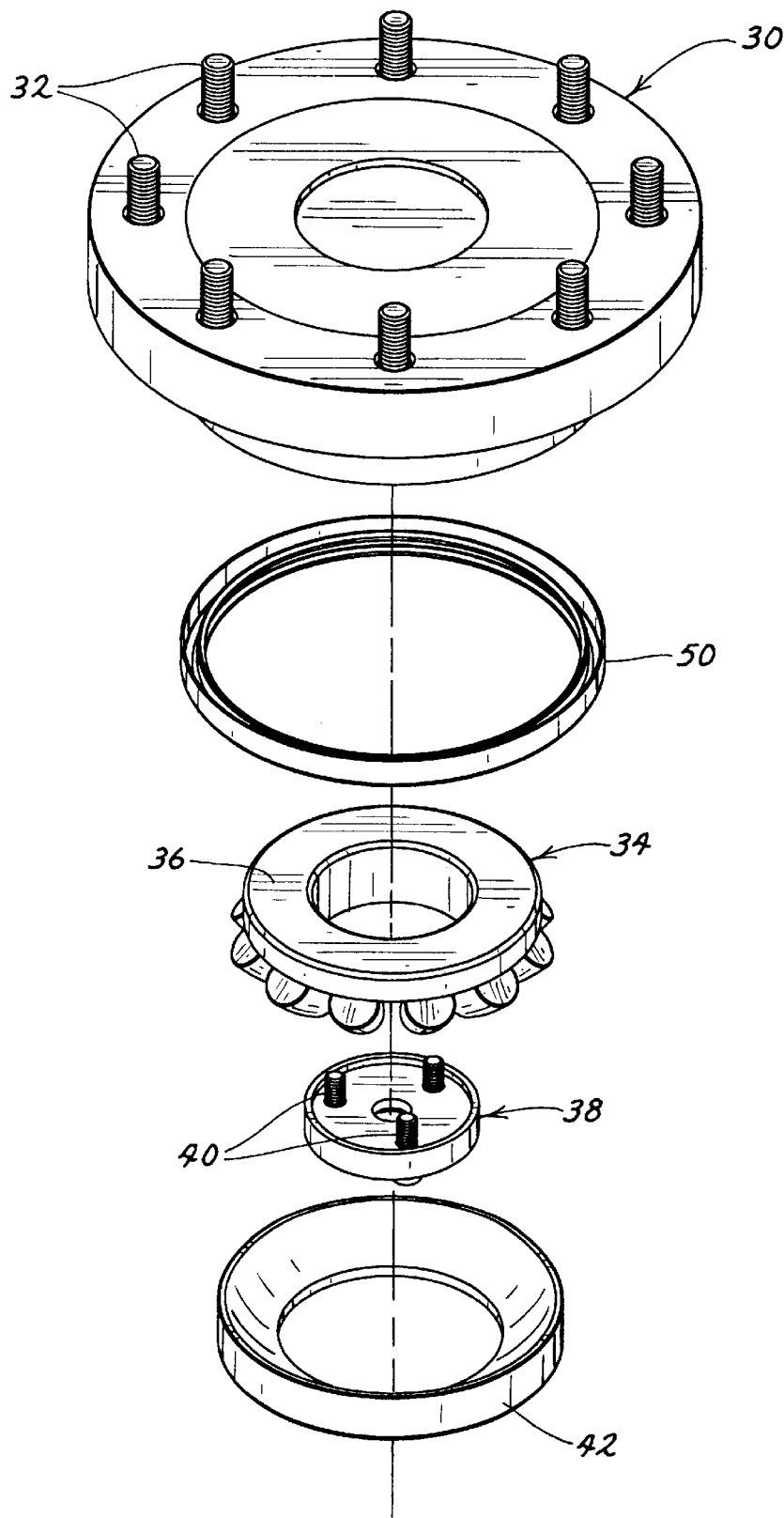

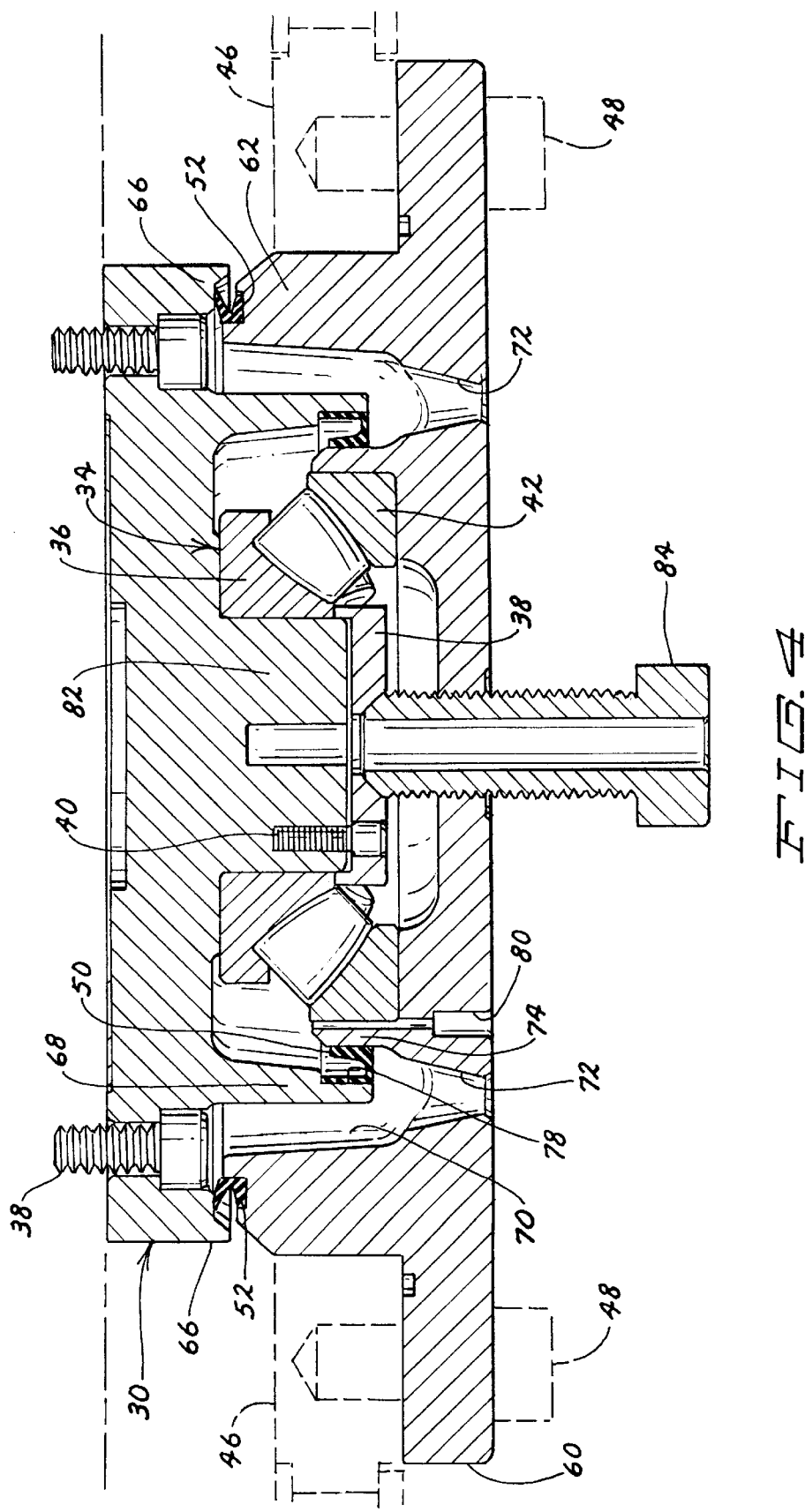

ASSEMBLY FOR SUPPORTING A ROTATING STRUCTURE

FIELD OF THE INVENTION

The present invention relates generally to centrifugal dryers used to dry particulates entrained in a transport fluid and particularly to a seal assembly useful for preventing the transport fluid from reaching the bearing rotationally supporting the dryer shaft.

BACKGROUND OF THE PRESENT INVENTION

Centrifugal dryers are used to dry particulates, such as newly manufactured plastic spheres, for example. Representatively speaking, such dryers generally include a housing enclosing a cylindrical screen having a longitudinal axis. A rotor having a rotation axis coincident with the screen axis is mounted for rotation inside the housing.

A slurry including the particulates and a particulate entraining transport fluid, typically water, is delivered to the dryer through a conduit fluidly connected thereto at or near the bottom of the dryer. The slurry is usually delivered at a large flow rate to the dryer. As with any system where fluid transfer occurs in at high pressure and large flow rates and in association with moving parts, whether rotational or translational, leaks develop. In the case of a centrifugal dryer, these leaks can result in the accumulation of corrosive fluid in and around the bearing that rotationally supports the dryer rotor, thus shortening the life of the bearing and the dryer.

It would be desirable to have an improved seal that would substantially reduce the likelihood of fluid accumulating in and around a bearing that rotationally supports the rotor of a centrifugal dryer.

SUMMARY OF THE INVENTION

It is an object of the present invention to provide new and improved apparatus that is not subject to the foregoing disadvantages.

It is another object of the present invention to provide an improved end cap for a centrifugal dryer rotor that more successfully drains fluid away from bearing than prior art seals.

It is still another object of the present invention to provide an end cap for a centrifugal dryer than includes drainage ports.

The foregoing objects of the present invention are provided by an improved assembly for rotating and sealing a centrifugal dryer and a dryer including such a sealing assembly. A seal according to the present invention includes an end cap supporting a bearing that in turn rotationally supports a rotor. The end cap has an attachment portion, which in the embodiment of the invention shown herein is in the form of an annulus. The end cap further includes a seal ring including a groove receiving a v-ring seal that sealingly engages the stub shaft attached to the dryer rotor. The seal ring defines a drain cavity having at least one drain port out of which any fluid that gets by the v-ring seal can drain from the end cap. The drain port is disposed at a lower level than the v-ring seal and the grease seal so that fluid can drain away without accumulating and infiltrating past the bearing grease seal and into the bearing compartment formed between the end cap and rotor the stub shaft.

Stated otherwise, the present invention provides a rotor mount including a stub shaft and an end cap cooperating to define a bearing compartment and providing a seal against substantial intrusion of fluid into the bearing compartment and a drain for any fluid that does infiltrate past the seal. The aforesaid drain comprises at least a drain port disposed at a lower level than the grease seal for the bearing housed in the bearing compartment.

The foregoing objects of the invention will become apparent to those skilled in the art when the following detailed description of the invention is read in conjunction with the accompanying drawings and claims. Throughout the drawings, like numerals refer to similar or identical parts.

BRIEF DESCRIPTION OF THE DRAWINGS

FIGS. 3A and 3B depict the apparatus shown in FIG. 3 in an exploded perspective view.

FIG. 4 shows the apparatus of FIG. 2 in a cross-sectional view taken along viewing plane 4—4 of FIG. 2.

DETAILED DESCRIPTION OF THE INVENTION

Figure 1:
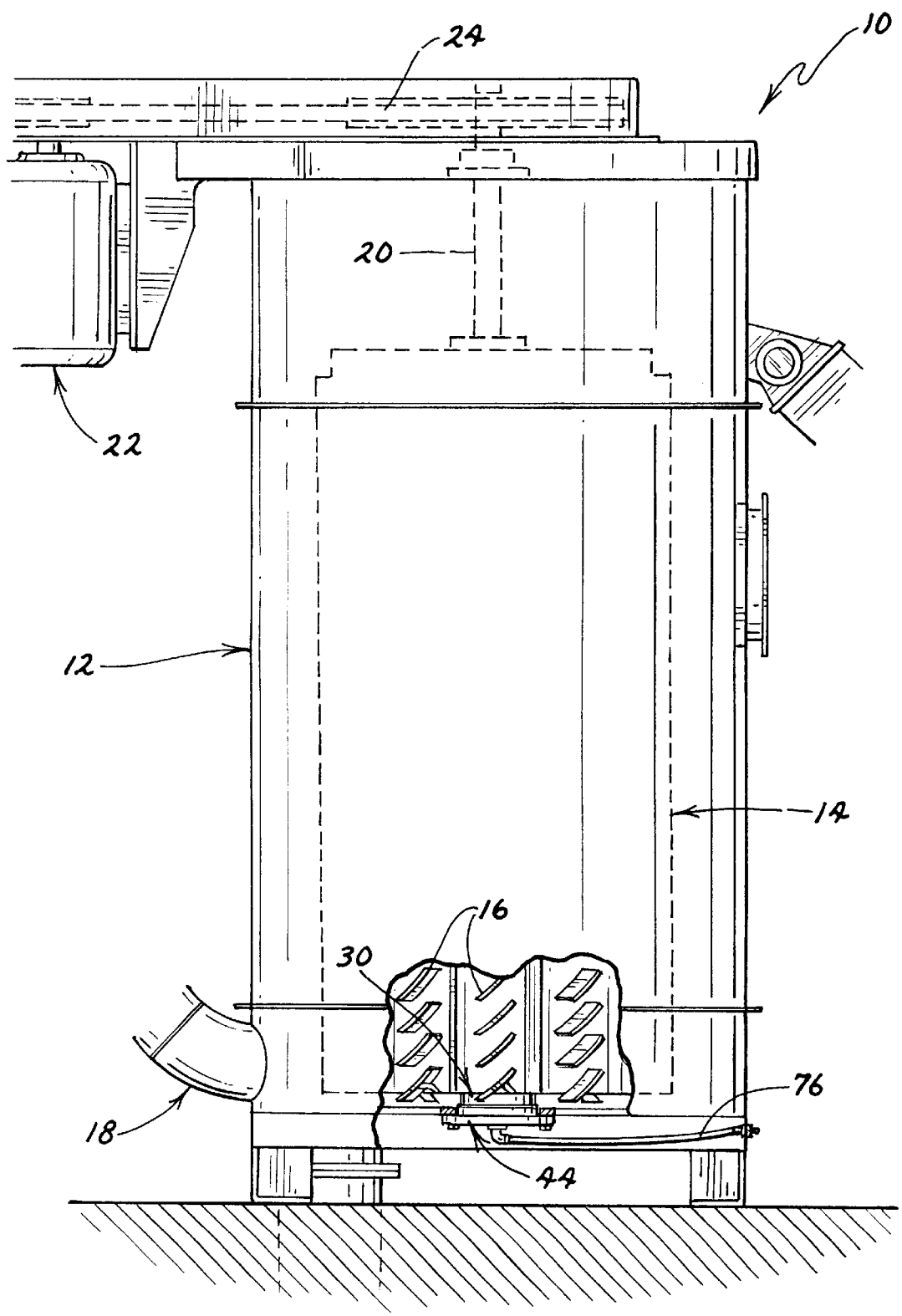
FIG. 1 shows in a side elevation, partial sectional and phantom view, a centrifugal dryer of the kind in which the present invention may find use.

FIG. 1 illustrates a centrifugal dryer 10 in which a seal in accord with the present invention may find use. Details of the overall, general structure and manner of operation of such a dryer may be obtained from a review of U.S. Pat. No. 5,987,769 to Ackerman et al., which is assigned to the assignee of the present invention and which is incorporated herein by reference. Thus, only a minimal description of the operation of such a dryer 10 will be provided herein. Dryer 10 includes a housing 12, which is typically square in configuration, though it may reasonably have other configurations such as cylindrical. The dryer 10 includes a rotor 14 rotationally mounted within the housing 12. It will be understood that the rotor 14 is mounted within a circumferentially extending screen, which is not seen in the Figure because of the scale of the drawing. An example of such a screen can be seen in the aforementioned patent, however.

As explained in the aforementioned patent, rotor 14 has a plurality of outwardly projecting rotor blades 16. These blades engage the slurry, which is delivered to the dryer 10 through the conduit 18. That is, as the rotor rotates, the blades 16 will strike the particulates and throw them outwardly to engage the screen. The screen includes apertures having a size small enough to prevent the paraticulates from passing through the screen but allowing the transport fluid to do so. As the rotor 14 rotates, then, the particulates are bounced repeatedly back and forth between the rotor and rotor blades on one hand and the screen on the other as they move from the inlet conduit 18 to the outlet, which has been omitted from the Figure for purposes of clarity.

Figure 2:
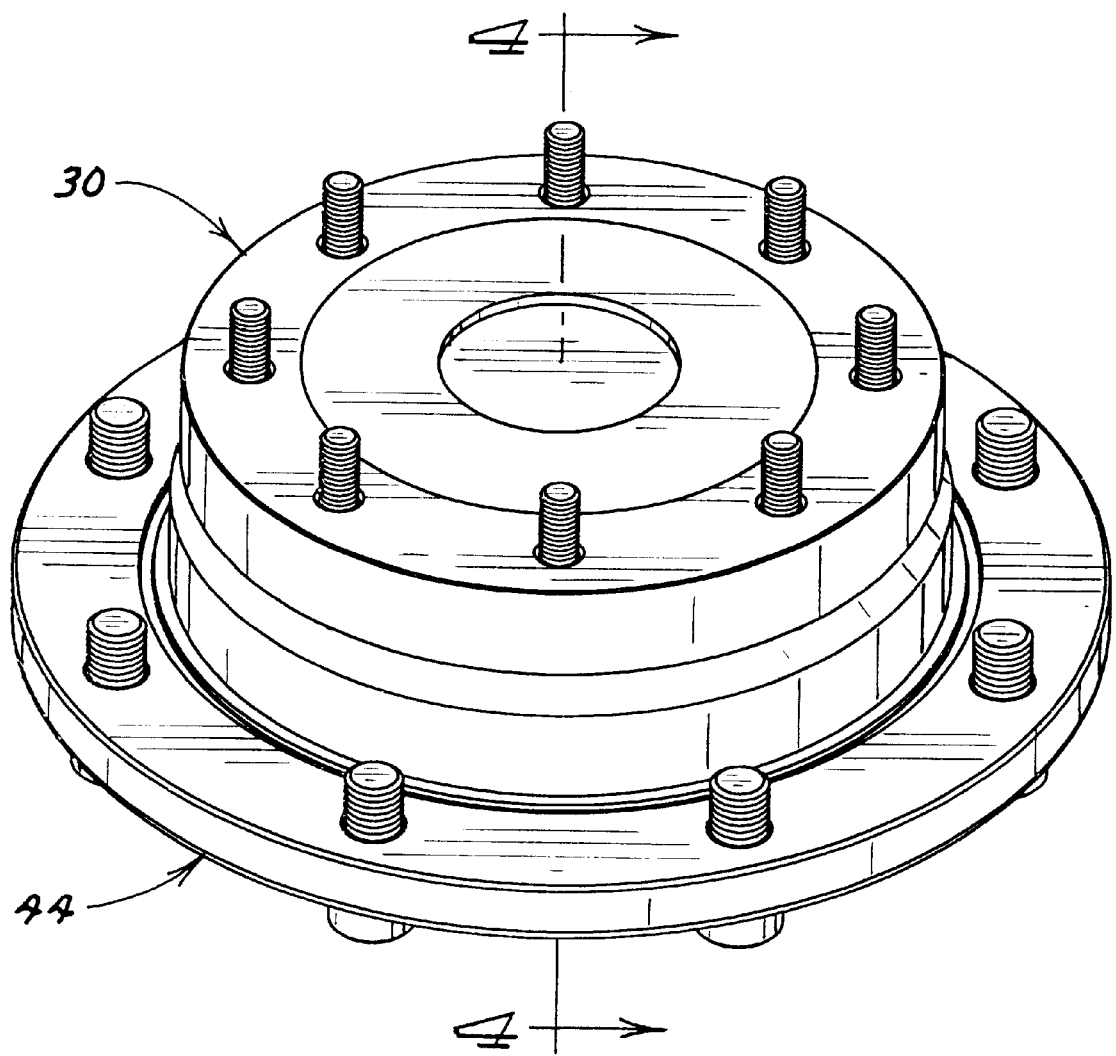
FIG. 2 shows in a perspective view a stub shaft and end cap including a seal in accord with the present invention, which may find use with a dryer such as that shown in FIG. 1.
Figure 3B:
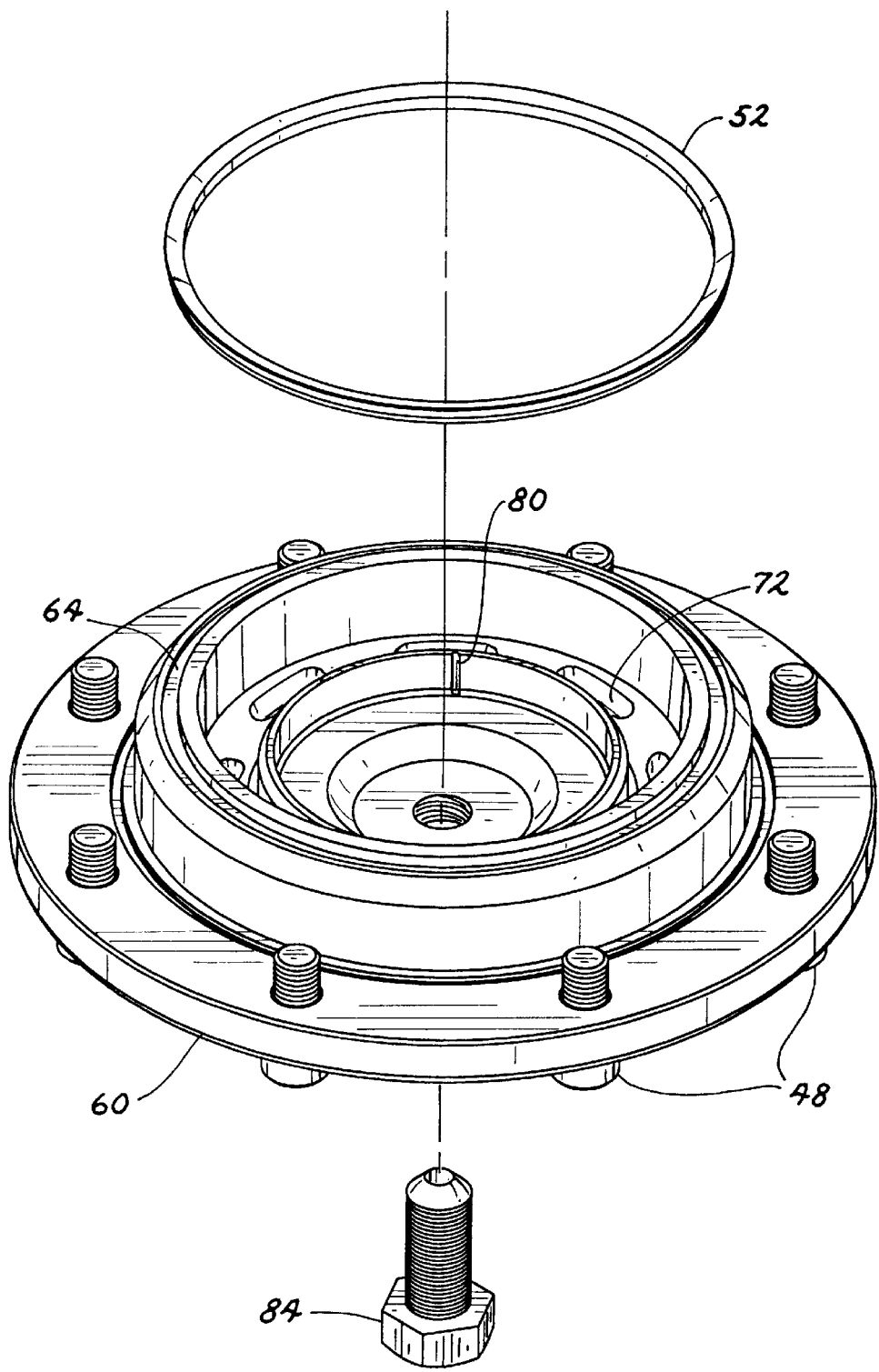

Referring now to FIGS. 2–4, the present invention will be described in greater detail. The rotor 14 includes an upper drive shaft 20 that is rotationally driven by a motor 22 through any appropriate known drive means, such as a chain or drive belt 24. At its lower end, the rotor is mounted for rotation. Thus, the lower end of the rotor 14 will include a substantially flat mounting plate (not seen) to which a stub shaft 30 is mounted using mounting bolts 32. A roller bearing 34 having an upper race 36 is held against the stub shaft 30 by a bearing retainer plate 38, which bolts into the stub shaft 30 by means of bolts 40. The lower race 42 is received by an end cap 44 and held against the rollers by the end cap 44 by the attachment of the end cap 44 to the bottom pan or frame 46 (shown in phantom outline in FIG. 4) of the housing 12 with bolts 48. as will be described further below. As further seen particularly in FIGS. 3A and 3B, a pair of seals 50 and 52 are supplied to provide sealing functions to be described hereafter.

Referring particularly to FIGS. 3B and 4, the end cap 44 will be further described. End cap 44 includes an attachment portion 60, which in the present embodiment takes the form of an annulus, though it will be understood that other configurations could also be used. As previously noted, the attachment portion 60 is used to attach the end cap to the housing frame 46. Radially inwardly from the attachment portion is a seal ring 62 including a seal groove 64 that receives and retains v-ring seal 52. The seal 52 engages the outer flange 66 of the stub shaft 30.

The stub shaft 30 further includes an inner circumferential flange 68 which together with the seal ring 62 defines a drainage compartment 70. Any fluid that infiltrates past the v-ring seal 52 will collect within the drainage compartment 70 and then drain out through the drainage ports 72. An inwardly disposed ring-shaped end cap flange 74 on the end cap 44 cooperates with the flange 68 of the stub shaft 30 to hold the grease seal 50.

The end cap 44 and the stub shaft 30 cooperatively define a bearing compartment that houses the roller bearing 34. In addition to its function of preventing fluid infiltration into the bearing compartment, the grease seal 50 functions to keep grease around the bearing, which is provided to the bearing through a standard grease zerk and hose 76 (best seen in FIG. 1). The grease seal 50 is received by a seal seat 78 disposed on the inner flange 68. A grease overflow 80 is provided on the end cap flange 74 to enable excess grease to drain away. It will be observed that the lower race 42 is held in place by the end cap flange 74 and that the upper bearing race 36 is press fit against the shaft 82 of stub shaft 30. Also observed in the Figures is a jack screw 84 that is helpful in attaching the end cap to the frame 46.

The present invention thus provides an improved end cap and seal for a rotating structure that provides a drainage compartment and drainage ports located at a lower level than both the primary fluid seal and the grease seal protecting the bearing from fluid infiltration. The end cap and stub shaft cooperate to define both a bearing compartment and a drainage compartment, each protected by respective seals that aid in preventing fluid from reaching the bearing itself.

The present invention having thus been described, other modifications, alterations, or substitutions may now suggest themselves to those skilled in the art, all of which are within the spirit and scope of the present invention. It is therefore intended that the present invention be limited only by the scope of the attached claims below.

What is claimed is:

1. An assembly with a frame for rotatably supporting a rotating structure, said assembly comprising:
   a stub shaft for attachment to the rotating structure, said stub shaft including:
      an outer circumferential flange; and
      an inner circumferential flange; and
   an end cap for attachment to said frame supporting the rotating structure, said end cap including:
      an attachment portion for attachment to a frame supporting the rotating structure;
      a seal ring including a seal groove receiving a ring seal therein; and
      at least one drainage port disposed radially inwardly of said seal ring;
   wherein said seal ring and said inner circumferential flange cooperate to define a drainage compartment and said ring seal sealingly engages said outer circumferential flange of said stub shaft to substantially prevent infiltration of fluids past said ring seal into said drainage compartment.

2. The assembly of claim 1 and further including a grease seal, said grease seal being received by a grease seal seat on said inner circumferential flange of said stub shaft.

3. The assembly of claim 2 wherein said end cap further includes an end cap flange and said end cap flange and said inner circumferential flange of said stub shaft cooperate to define a bearing compartment for housing a bearing rotatingly supporting the rotating structure.

4. The assembly of claim 3 wherein said stub shaft includes a shaft and said bearing comprises an upper race received by said shaft, said upper race being held against said shaft by a bearing retainer.

5. The assembly of claim 4 wherein said assembly includes a lower bearing race received by said end cap.

6. The assembly of claim 3 wherein said end cap flange includes a grease overflow port.

7. The assembly of claim 3 wherein the rotating structure is the rotor of a centrifugal dryer.

8. The assembly of claim 1 wherein the rotating structure is the rotor of a centrifugal dryer.

* * * * *